Oct. 3, 1950     L. P. MORRIS ET AL     2,524,534
ANTENNA
Filed Aug. 4, 1947
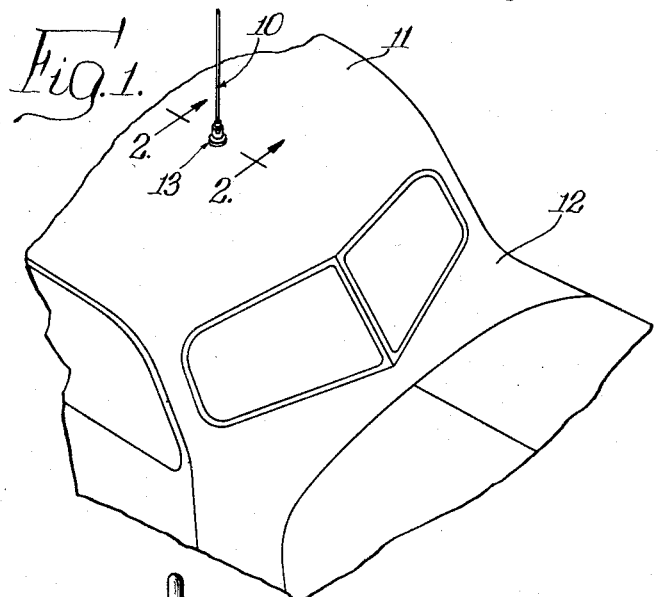
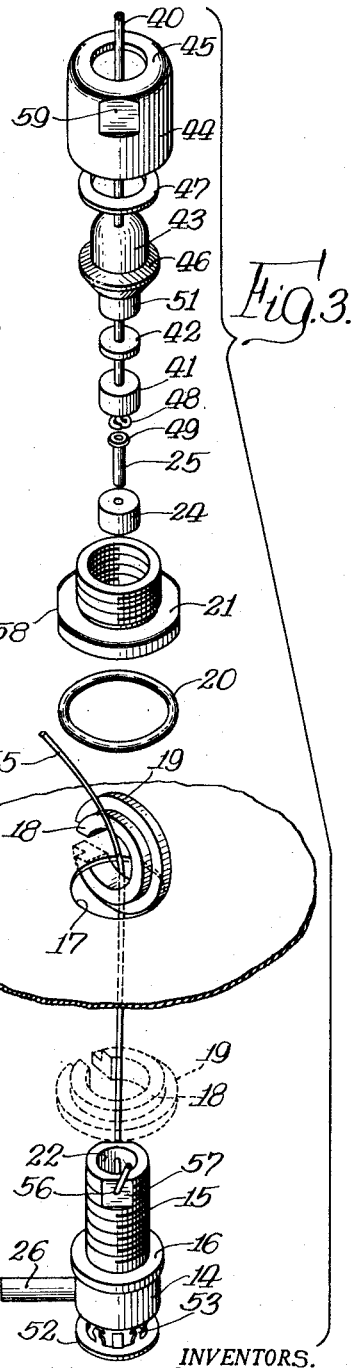
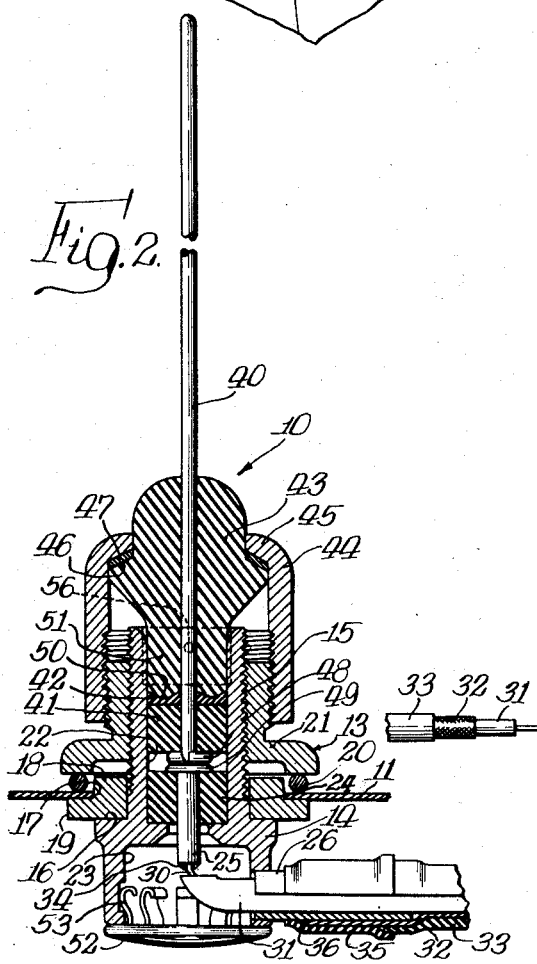
INVENTORS.
Lloyd P. Morris,
Joseph R. Slatkay,
Methyle F. Spotts,
By Forman L. Mueller
Atty.

Patented Oct. 3, 1950

2,524,534

UNITED STATES PATENT OFFICE 2,524,534

ANTENNA

Lloyd P. Morris, Elmwood Park, Joseph R. Slatkay, Chicago, and Merhyle F. Spotts, Evanston, Ill., assignors to Motorola Inc., Chicago, Ill., a corporation of Illinois Application August 4, 1947, Serial No. 766,116

8 Claims. (Cl. 250—33)

This invention relates generally to antennas and more particularly to an antenna adapted to be mounted on the top of an automobile or other vehicle.

In the prior art a great number of arrangements have been used for mounting antennas on automobiles or other vehicles. For use in a moving vehicle a secure mounting must be provided and it is, of course, desirable that the mounting can be easily installed. For use with an automobile, it is particularly desirable that the antenna make an attractive appearance and require as little alteration or defacing of the automobile as possible. Antennas mounted on the top of an automobile or other vehicle have been used in the past but they have been objectionable as the installation is very difficult. This is because it has been necessary to remove the upholstery in the top of the automobile so that access can be had to both sides of the car top for securing the antenna mounting thereto.

It is, therefore, an object of this invention to provide an improved automobile antenna which is of simple construction.

It is a further object to provide a mounting for an antenna which can be installed in an opening in a flat surface by access to only one side thereof.

A still further object of this invention is to provide an automobile antenna including a mounting which can be installed on the top of a car without removing the upholstery on the underneath side thereof and means for supporting the antenna on the mounting and making a lead-in connection therethrough.

A feature of this invention is the provision of an automobile antenna including a mounting which can be secured to the car top by access to the top surface only, and an antenna adapted to be secured to the mounting in which the mounting includes a lead-in connection which is automatically engaged by the antenna when the antenna is secured to the mounting.

A further feature of this invention is the provision of an antenna mounting adapted to be installed in an opening in a flat support by access to only one side thereof which includes a tubular member of such size to be inserted through the opening, a split ring which can be inserted through an opening and which engages a shoulder on the tubular member to prevent withdrawal of the tubular member through the opening and a nut engaging a threaded portion of the tubular member to hold the member on the car top.

A still further feature of this invention is the provision of a mounting adapted to be secured in an opening in the top of the car by access to only one side of the top and which includes an insulated pin for connection to a lead-in conductor and means for grounding the shield of the lead-in through the mounting to the car top.

Further objects, features and advantages will be apparent from a consideration of the following description taken in connection with the accompanying drawings in which:

Fig. 1 is a perspective view illustrating the mounting of the antenna on the top of an automobile;

Fig. 2 is a cross-sectional view along the lines 2—2 of Fig. 1; and

Fig. 3 is an exploded view illustrating the manner in which the antenna is installed.

In accordance with the invention an antenna is secured to the top of an automobile by access to one side of the top only. This is accomplished by drilling an opening through the metal top and providing an assembly which can be inserted through the opening and secured to the portion of the top surrounding the opening. The assembly includes a tubular member including a threaded portion with a shoulder at one end thereof which can be inserted in the opening and a split ring which can also be inserted through the opening and then positioned between the shoulder on the tubular member and the car top to prevent withdrawal of the tubular member through the top. A threaded ring is screwed on the threaded portion for securing the tubular member to the top. An insulated pin is provided in the tubular member to which a lead-in conductor is connected and a tubular stem is provided on the tubular member through which the lead-in enters and to which the shield thereof is grounded. An antenna is positioned in the tubular member and includes a portion which engages the connecting pin therein. An annular clamping ring is provided for securing the antenna to the mounting.

Referring now to Fig. 1 there is illustrated an antenna 10 in accordance with the invention secured to the metal top 11 of an automobile 12. It is seen that a mounting 13 is provided for securing the antenna to the car top 11. In Figs. 2 and 3 details of the antenna and mounting are shown. The mounting 13 comprises a tubular member 14 including a threaded portion 15 and an annular shoulder 16. The member 14 is of such size that it can be inserted in the opening 17 in the car top 11. A ring 18 having a projecting rim 19 is positioned between the top 11 and the shoulder 16 on the tubular member to prevent withdrawal of the tubular member through the opening 17. An annular sealing washer 20 is next placed around the edge of the opening and then the threaded ring 21 is secured to the threaded portion 15 of the tubular member 14 to hold the tubular member in place on the car top 11.

For supporting an antenna on the mounting and making an electrical lead-in connection thereto, cylindrical cavities 22 and 23 are provided in the tubular member. An annular insulating member 24 is positioned in the bottom of the cavity 22 and has a connecting pin 25 secured therein. The pin 25 may be hollow to receive the end of the lead-in conductor as will be more fully described. A short tubular stem 26 is secured in the tubular member 14 providing an elbow through which the lead-in conductor enters the mounting. As shown in Figs. 2 and 3 the lead-in comprises a conductor 30, an insulating coating 31, a metallic shield 32 and an outer insulating coating 33. The conductor 30 is positioned in the hollow pin 25 and secured therein as by solder 34. The insulating coating 31 enters the stem 26 and the metallic shield 32 is spread to be positioned about the stem 26. In order to make a good electrical contact between the shield 32 and the stem 26, the shield is soldered to the stem as indicated at 36. A resilient insulating collar 35 is then positioned over the stem 26, metallic shield 32 and outside insulating coating 33 as shown in Fig. 2 to provide a neat assembly and to hold the shield 32 tightly against the stem to make good electrical contact therewith.

The antenna includes a rod-like element 40 on which is positioned an annular insulating member 41, a resilient washer 42 and a flared plug 43. The member 41, washer 42 and the bottom of the plug 43 are of such outside diameter to fit snugly inside the cylindrical chamber 22. For holding this assembly in position on the mounting an annular clamping ring 44 is provided having an inturned lip 45 which engages the flared shoulder 46 on the plug 43 through washer 47. It is seen that by screwing the clamping ring 44 on the annular ring 21 the plug 43 is drawn into the tubular member 14 compressing the washer 42 and acting through annular member 41 to press the flattened end 48 of the rod antenna element 40 against the head 49 of the pin 25. The bottom surface of the plug 43 has an annular rounded edge 50 which is effective to compress the washer 41 so that the assembly is firmly held in place. Therefore, a rigid support is provided by the antenna and a good electrical connection is made to the lead-in through the pin 25.

Referring now to Fig. 3 the manner in which the antenna is installed on a car top is clearly shown. First the opening 17 is drilled in the car top from the top surface thereof. The lead-in connection is then assembled on the mounting prior to installation of the same on the car top. As previously stated the inner conductor 30 of the lead-in is positioned in the opening in pin 25 and soldered thereto. The shield 32 is forced about the stem 26 and soldered thereto and then the sleeve 35 is positioned in place. After this assembly is completed a cap 52 having resilient fingers 53 is secured to the bottom end of the tubular member 14 to completely enclose the connection. Before positioning the tubular member 14 through the opening 17, a fine wire 55 is secured in openings 56 in the tubular member to prevent completely dropping the tubular member. The tubular member 14 is then positioned through the opening 17 in the car top with the lead-in thereto being positioned between the car top and the upholstery on the inside of the car top. The lead-in is directed to the position desired in a well known manner to make contact with a radio installed in the vehicle. While the tubular member is held by the wire 55 the split ring 18 is positioned around the wire and passed through the opening 17 in the manner illustrated in Fig. 3. After the ring has been passed through the opening it will drop down around the threaded portion 15 of the tubular member until it engages the shoulder 16 thereon. The tubular member is then pulled up against the car top until the ring 18 is seated in the opening 17 with the rim 19 preventing removal of the tubular member and the ring through the opening. The washer 20 and annular ring 21 are then positioned over the wire 55 and positioned in place about the tubular portion 15 as shown in Fig. 2. Flat sides 57 are provided adjacent the opening 56 in the tubular member 14 to provide clearance for wire 55 so that the ring 21 may be threaded on the tubular portion 15 without removing the wire from the opening 56. The flat sides 57 also provide means for preventing turning of the tubular member when the annular ring 21 is tightly secured thereon. To facilitate tightening the ring 21, flat sides 58 are also provided on the skirt thereof. The washer 20 is thus tightly clamped against the top of the roof to form a water-tight seal and also to make a good ground connection between the mounting and the car top.

After the mounting has been secured to the car top as described above, the antenna can be secured thereto by inserting the annular member 41, washer 42 and the base portion 51 of the plug 43 therein. The washer 47 is then placed around the flared shoulder 46 of the plug and the annular clamping ring 44 screwed down on the annular ring 21. Flat surfaces 59 are provided on the annular clamping ring 44 to facilitate tightening the clamping ring. As previously stated, the resilient washer 42 is engaged by the rounded surface 50 on the plug and compressed thereby when the clamping ring is screwed down. The action of the resilient ring will keep the assembly tight at all times so that the enlarged portion 48 of the antenna will make a firm contact with the head 49 of the connecting pin and will be held tightly in position and not become loose due to the vibration of the vehicle. The resilient washer 42 also serves to waterproof the antenna. The opening in plug 43 may be large enough to permit water to enter about the rod 40. However, when the washer 42 is compressed, it makes a tight seal about the rod 40 and also against the inside cylindrical surface of the tubular member 14 to prevent entry of water into the mounting.

It is seen from the above that we have provided an antenna for installation on the top of an automobile which includes a mounting which can be installed by access to the top side only of the car top. The construction of the antenna and mounting is simple and rugged so that the requirement for maintenance and repair is small. Antennas in accordance with the invention can be constructed of various sizes as will be required in different applications and although particularly adapted for use with a short whip antenna for high frequency use, the principles involved are also applicable to larger antennas as are necessary for low frequency use such as for broadcast receivers. It is apparent from the foregoing description that in case of damage to the rod-like antenna element, this element can be replaced without removing the mounting from the car top. This makes replacement of the damaged antenna element a very simple operation.

While we have described one embodiment of our invention which has been found to be satisfactory in use, it is obvious that various changes and modifications can be made therein without departing from the intended scope of the invention as defined in the appended claims.

We claim:

1. An antenna comprising a mounting having a cylindrical cavity with a contact at the bottom thereof and an outer threaded portion, a rod-like element having an enlarged portion at one end thereof, an assembly including an annular insulating member, a resilient washer, and an annular flared plug positioned in the order named about said rod-like element with said insulating member adjacent said enlarged portion, said insulating member, washer and a portion of said plug being of such size to fit in said cavity, and an annular clamping ring engaging said flared plug and the threads on said mounting to hold said other components thereon with said enlarged portion engaging said conducting pin.

2. An antenna comprising a rod-like antenna element and a mounting for supporting the same on a car top, said mounting having a cylindrical cavity with a contact at the bottom thereof and an outer threaded portion, said rod-like element having an enlarged portion at one end thereof, an annular insulating member, a resilient washer, and an annular flared plug positioned in the order named about said rod-like element with said insulating member adjacent said enlarged portion, said insulating member, washer and a portion of said plug being of such size to fit in said cavity, and an annular clamping ring engaging said flared plug and the threads on said mounting to hold said other components thereon with said enlarged portion engaging said conducting pin.

3. An antenna comprising a mounting having a cylindrical cavity with a contact at the bottom thereof and an outer threaded portion, a rod-like element having an enlarged portion at one end thereof, an annular insulating assembly about said rod-like element adjacent said enlarged portion, a portion of said assembly being arranged to fit in said cavity, and an annular clamping ring engaging said assembly and the threads on said mounting to secure said element thereto with said enlarged portion engaging said contact.

4. An antenna mounting adapted to be installed in an opening in a flat support by access to only one side thereof, comprising a member adapted to support an antenna element and including an insulated terminal for making connection to said element, a shielded lead-in conductor connected to said terminal, a tubular stem secured to said member for receiving said lead-in conductor and grounding the shield thereof, said member being of such size to be inserted through said opening and having a threaded portion and a shoulder thereon, a split ring of such configuration to be capable of being inserted through said opening and to engage said shoulder on said member to prevent withdrawal of said member through said opening, a threaded ring cooperating with said threaded portion for securing said member to said support, and a washer positioned between said threaded ring and said support to provide a tight seal and make an effective ground connection between said support and said mounting.

5. An antenna mounting adapted to be installed in an opening in a supporting wall when access can be had to only one side of such wall, said mounting comprising an elongated member of such size as to be insertable lengthwise from end to end thereof through the opening from said one side of the wall, said member having a shoulder thereon with a reduced portion extending from said shoulder to the end of said member which is inserted last through the opening, a retaining device of such configuraton as to be insertable in its entirety through the opening from said one side of the wall, said device having inner dimensions permitting passage of said device longitudinally over said reduced portion to seat on said shoulder and having outer dimensions greater than that of the opening in the wall to prevent withdrawal of said member when said retaining device is seated on said shoulder, and means cooperating with the reduced portion of said member on said one side of the supporting wall for securing said member to the wall.

6. An antenna mounting adapted to be installed in an opening in a supporting wall when access can be had to only one side of such wall, said mounting comprising an elongated member of such size as to be insertable lengthwise from end to end thereof through the opening from said one side of the wall, said member having a shoulder thereon with a reduced threaded portion extending from said shoulder to the end of said member which is inserted last through the opening, a split ring of such configuration as to be insertable through the opening from said one side of the wall, said ring having an inner diameter permitting passage of said ring longitudinally over said threaded portion to seat on said shoulder and having an outer diameter exceeding that of the opening in the wall to prevent withdrawal of said member when said ring is seated on said shoulder, and a threaded nut cooperating with said threaded portion on said one side of the supporting wall for securing said member to the wall.

7. An antenna mounting adapted to be installed in an opening in a supporting wall when access can be had to only one side of such wall, said mounting comprising an elongated member of such size as to be insertable lengthwise from end to end thereof through the opening from said one side of the wall, said member having a shoulder thereon with a reduced threaded portion extending from said shoulder to the end of said member which is inserted last through the opening, a split ring of such configuration as to be insertable through the opening from said one side of the wall, said ring having an inner diameter permitting passage of said ring longitudinally over said threaded portion to seat on said shoulder and having an outer diameter exceeding that of the opening in the wall to prevent withdrawal of said member when said ring is seated on said shoulder, a threaded ring cooperating with said threaded portion on said one side of the supporting wall for securing said member to the wall, and a washer positioned between said threaded ring and the wall to afford a tight seal and an effective ground connection between the wall and said mounting.

8. An antenna mounting adapted to be installed in an opening in a supporting wall when access can be had to only one side of such wall, said mounting comprising an elongated member of such size as to be insertable lengthwise from end to end thereof through the opening from said one side of the wall, said member having a shoulder thereon with a reduced threaded portion extending from said shoulder to the end of said member which is inserted last through the opening, a split ring of such configuration as to be insertable through the opening from said one side of the wall, said ring having an inner diameter permitting passage of said ring longitudinally over said threaded portion to seat on said shoulder and having an outer diameter exceeding that of the opening in the wall to prevent withdrawal of said member when said ring is seated on said shoulder, a locking ring having internal threads cooperating with the threaded portion of said member on said one side of the supporting wall for securing said member to the wall, means for securing an antenna element to said tubular member including an annular insulator having a portion which extends into said tubular member and another portion which protrudes from said tubular member, and a clamping ring having screw-threaded engagement with the exterior of said locking ring and engaging the protruding portion of said insulator to hold said insulator within said tubular member.

LLOYD P. MORRIS.
JOSEPH R. SLATKAY.
MERHYLE F. SPOTTS.

REFERENCES CITED

The following references are of record in the file of this patent:

UNITED STATES PATENTS

| Number | Name | Date |
|---|---|---|
| 2,026,454 | Benzing | Dec. 31, 1935 |
| 2,284,222 | Miller | May 26, 1942 |
| 2,332,752 | Ratcliff | Oct. 26, 1943 |
| 2,354,314 | Harsted | July 25, 1944 |
| 2,397,151 | Mitchell | Mar. 26, 1946 |
| 2,444,189 | Finneburgh, Jr. | June 29, 1948 |